United States Patent [19]
George et al.

[11] 3,979,138
[45] Sept. 7, 1976

[54] ADJUSTABLE TRAILER HITCH

[76] Inventors: Jimmie George, P.O. Box 212;
Charles P. Tyson, P. O. Box 191,
both of Mer Rouge, La. 71261

[22] Filed: Mar. 28, 1975

[21] Appl. No.: 563,216

Related U.S. Application Data

[63] Continuation-in-part of Ser. No. 492,679, July 29, 1974, Pat. No. 3,904,225.

[52] U.S. Cl. ............................ 280/478 R; 280/491 B
[51] Int. Cl.² ............................................. B60D 1/06
[58] Field of Search ............. 280/478 R, 477, 491 R, 280/491 B, 491 D

[56] References Cited
UNITED STATES PATENTS

| | | | |
|---|---|---|---|
| 2,386,195 | 10/1945 | Clark | 280/477 |
| 2,451,660 | 10/1948 | Clark et al. | 280/478 R |
| 2,823,930 | 2/1958 | Cooper | 280/491 B |
| 2,898,127 | 8/1959 | Plumb | 280/478 R |
| 3,397,900 | 8/1968 | Sturges | 280/478 R |
| 3,427,045 | 2/1969 | Hoock | 280/478 R |
| 3,718,347 | 2/1973 | Mann | 280/491 B |

*Primary Examiner*—M. H. Wood, Jr.
*Assistant Examiner*—John A. Pekar
*Attorney, Agent, or Firm*—John M. Harrison

[57] ABSTRACT

An adjustable trailer hitch which includes a frame capable of being removably attached to the bumper or frame of a truck, car, or other vehicle, and a rotatable, extensible, hinged arm adapted to pivot on, extend from, and retract into the frame. The arm is pivotally pinned at one end of the frame and is fitted with a hinge in the approximate center, which hinge permits the arm to selectively retract into and extend from the frame, and to describe an acute angle when fully extended. The arm is fitted with a ball coupling adapted to mate with a ball receptacle mounted on the tongue or other frame member of a trailer to be towed.

9 Claims, 7 Drawing Figures

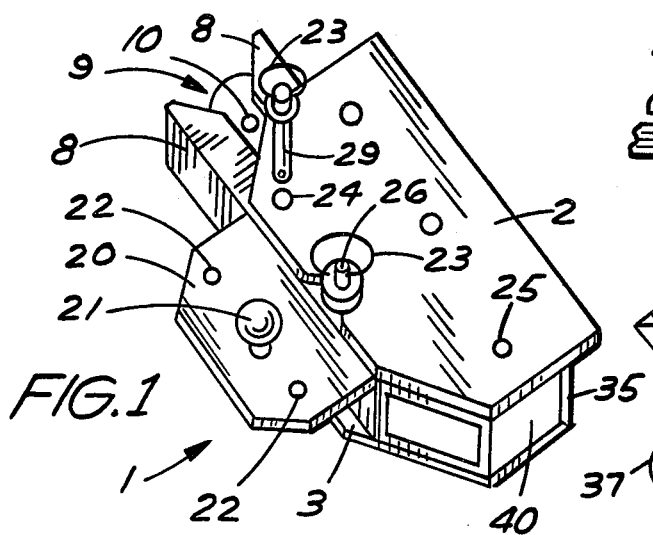
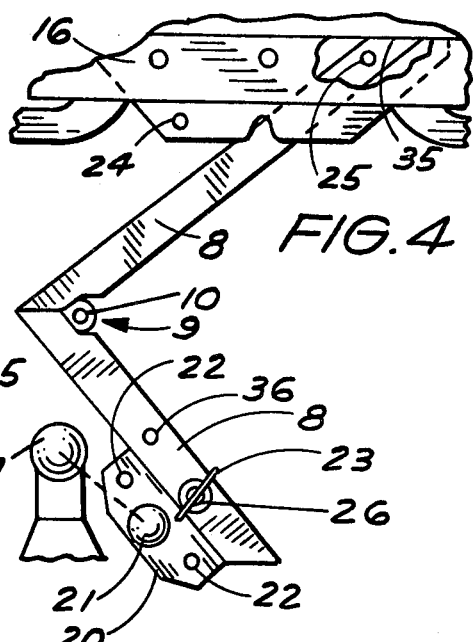
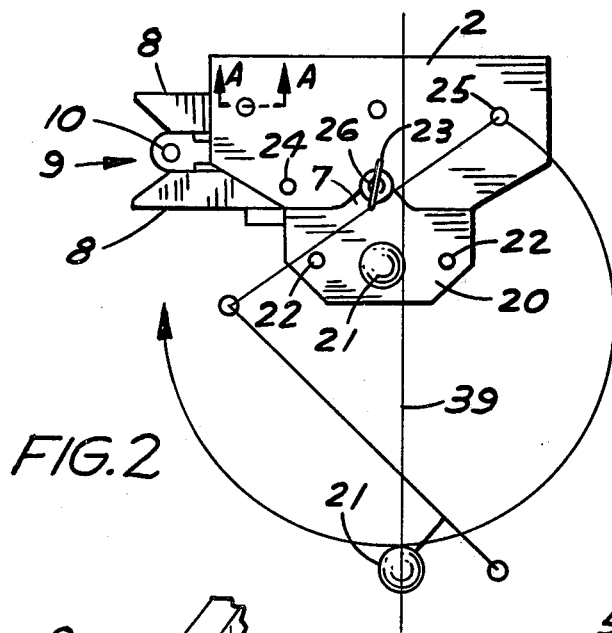
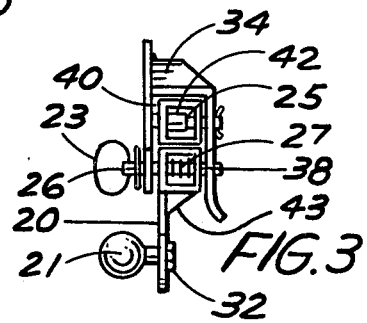
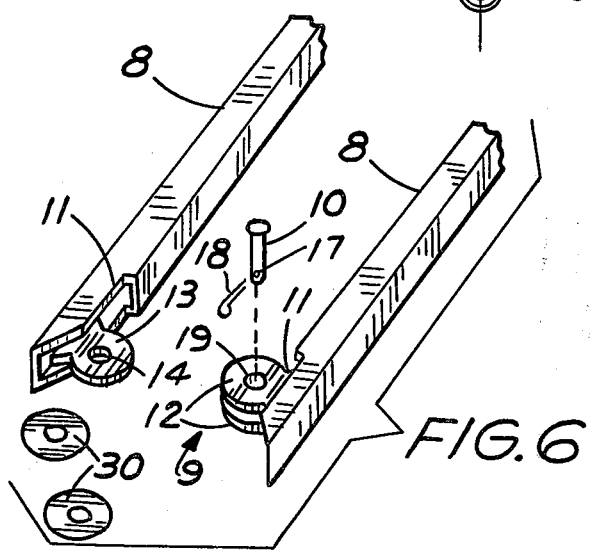
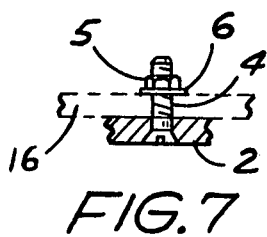
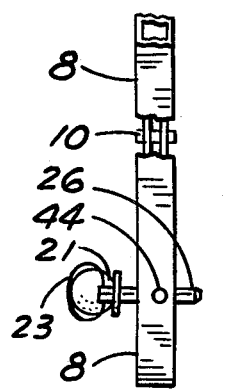

ADJUSTABLE TRAILER HITCH

CROSS-REFERENCE TO RELATED APPLICATIONS

This application is a continuation-in-part of copending application Ser. No. 492,679, filed July 29, 1974 now U.S. Pat. No. 3,904,225.

BACKGROUND OF THE INVENTION

1. Field of the Invention

This invention relates to a new and improved trailer hitch, and more particularly, to a new and improved adjustable trailer hitch which may be removably fitted to substantially any trailer with a minimum of maneuvering of the vehicle to which the hitch is attached. The device can be removably mounted to the bumper of a car, truck or other vehicle and is fitted with a rotatable arm which is itself extensible and retractable, to permit locking of the ball carried by the arm to the trailer ball receptacle when the trailer is located in substantially any position within reach of the extended arm on the hitch.

2. Description of the Prior Art

Heretofore, various trailer hitches have been designed to removably lock to the ball receptacle of a trailering vehicle, such as a boat or cattle trailer. Most of these hitches are mounted in fixed relationship to the towing vehicle and cannot be removed from the vehicle without undergoing an extensive unbolting procedure. Furthermore, these hitches are characteristically mounted with the carrying ball very close to the vehicle frame, and the vehicle must, therefore, necessarily be backed very close to and in precise alignment with the trailer tongue in order to effect proper coupling of the trailer to the hitch. As a result, during the backing operation, the vehicle is frequently damaged by bumping the trailer tongue, and unless the ball attached to the hitch is in perfect alignment with the trailer ball receptacle, the receptacle will not lock positively onto the ball and extensive additional maneuvering of the vehicle or trailer tongue is frequently necessary to achieve a firm and positive lock. This problem is, of course, intensified under circumstances where there is a large load on the trailer tongue, or where the trailer is in an inaccessible position which prevents ready maneuvering of the trailer ball receptacle into alignment with the ball located on the hitch.

Many attempts have been made to develop an adjustable trailer hitch, the ball of which may be extended and retracted from the vehicle frame in order to minimize the problem of hitch-to-trailer alignment. These efforts have chiefly taken the form of connectors which are telescoping in nature, and which may be lengthened or shortened as desired by the removal and insertion of pins from a telescoping ball-carrying member. However, many of these devices are functionally limited since the ball can be moved only on a single axis extending to and from the vehicle frame. Accordingly, if after a towing vehicle is backed up, the ball receptacle is located on an axis not in line with the extension and retraction axis, then the same problem of maneuvering the ball receptacle on the trailer into alignment with the ball on the trailer hitch is presented. Furthermore, the telescoping hitch is subject to the disadvantage of rusting and caking with dirt, which impedes the telescoping operation.

Accordingly, an object of the invention is to provide an extensible and retractable trailer hitch which is designed to fit on substantially all existing truck bumpers without the necessity of modifying the bumpers.

Another object of this invention is to provide an improved adjustable trailer hitch, the locking mechanism of which is capable of being initially extended independently of the carrying vehicle to cooperate with the locking apparatus of a trailer, and subsequently retracted into towing configuration.

Another object of the invention is to provide an adjustable trailer hitch which is capable of being extended, removably attached to a trailer, and retracted by first extending the hitch by moving the vehicle forward and subsequently backing the towing vehicle to effect retraction of the hitch into towing configuration.

Still another object of this invention is to provide an improved adjustable trailer hitch, the ball of which may be coupled with a ball receptacle located on a trailer under circumstances where the ball receptacle is located in substantially any position within the extension range of the ball from the hitch.

Yet another object of this invention is to provide an improved, adjustable trailer hitch which is characterized by great strength and which permits positive locking of the ball or other locking mechanism on the adjustable portion of the hitch with a ball receptacle or alternative mating receptacle of a trailer, without the necessity of additionally maneuvering the ball receptacle with respect to the ball, or the carrying vehicle with respect to the ball receptacle, after the ball and ball receptacle have been initially positioned within a predetermined distance of each other.

A further object of the invention is to provide an improved trailer hitch which permits maneuvering of an adjustable lock receptacle cooperating with the hitch into locking position with respect to a mating lock receptacle located on the tongue or frame of a trailer after the vehicle carrying the trailer hitch has been backed into position such that the trailer lock receptacle is within extension range of the adjustable lock receptacle located on the hitch.

A still further object of this invention is to provide an improved adjustable trailer hitch the ball of which can be maneuvered into substantially any position within the range of the extended arm of the hitch after the vehicle carrying the hitch is backed into close proximity to a trailer, the ball subsequently locked onto a ball receptacle located on the trailer, and the adjustable trailer hitch then automatically retracted into towing configuration by initially pulling the vehicle forward and then backing the vehicle carrying the hitch.

Another object of this invention is to provide a new and improved adjustable trailer hitch, the ball or alternative locking mechanism of which can be maneuvered within a specified, selected distance of a ball or alternative mating receptacle on a trailer, and subsequently adjusted to positively lock the ball to the ball receptacle without the necessity of further maneuvering the vehicle with respect to the trailer.

Yet another object of this invention is to provide an adjustable trailer hitch which may be removably mounted on the bumper or frame of a truck, automobile, motor home or other vehicle, and which when in retracted or folded position, occupies a minimum of space.

A further object of the invention is to provide an adjustable trailer hitch which may be initially maneuvered into position with respect to a trailer, the arm, carrying a ball or other locking device, extended and adjusted to cooperate with the ball receptacle or mating locking mechanism on the trailer, and the arm being subsequently locked into retracted configuration by initially pulling the vehicle forward to extend the arm and then backing the towing vehicle to achieve the desired retraction.

A still further object of the invention is to provide an adjustable trailer hitch which may be initially bolted or otherwise attached to the rear or front of a vehicle; the vehicle maneuvered into position with respect to a trailer; the hitch ball locked onto trailer; the vehicle pulled forward to fully extend the trailer hitch arm; the vehicle then backed to effect automatic positive retraction of the hitch; and the trailer subsequently towed without the necessity of manually locking the hitch into retracted position.

SUMMARY OF THE INVENTION

These and other objects of the invention are provided in a new and improved adjustable trailer hitch which includes the following elements:

1. A frame capable of being permanently or removably mounted on the bumper or other frame member of a vehicle;
2. An arm pivoted to the frame at one end thereof and having a hinge in the approximate center, whereby the free end of the arm can be extended from the frame and retracted back into the frame as desired;
3. Means attached to the free end of the arm for mating with and positively locking to a cooperating mechanism on a trailer to be towed, upon extension of the arm from the frame;
4. Locking means for securing the arm into retracted position in the frame to achieve a desired pulling or towing configuration of the hitch.

BRIEF DESCRIPTION OF THE DRAWING

The invention will be better understood in view of the following description presented with reference to the accompanying drawings:

FIG. 1 of the drawing is a perspective view of the adjustable trailer hitch of this invention illustrated in retracted position;

FIG. 2 is a top elevation of the adjustable trailer hitch illustrated in FIG. 1;

FIG. 3 is a side elevation of the adjustable trailer hitch illustrated in FIGS. 1 and 2;

FIG. 4 is a top elevation of the adjustable trailer hitch in extended configuration, illustrating the positioning of the ball with respect to a conventional trailer ball receptacle;

FIG. 5 is a side elevation, partially in section, of an extended portion of the arm of the adjustable trailer hitch illustrated in FIG. 4;

FIG. 6 is a perspective, exploded view of the elbow hinge in the pivoted arm of the adjustable trailer hitch illustrated in FIGS. 1 through 5; and FIG. 7 is a sectional view along lines A—A in FIG. 2 illustrating a preferred technique of mounting the adjustable trailer hitch on a vehicle.

DESCRIPTION OF THE PREFERRED EMBODIMENTS

Referring now to FIG. 1 of the drawing, the adjustable trailer hitch of this invention, generally illustrated by reference numeral 1, is shown in retracted position. As illustrated in FIG. 4 the trailer hitch is preferably mounted to a vehicle bumper plate 16 by means of mounting bolts 4, mounting washers 6, and mounting nuts 5, as more particularly illustrated in FIG. 7 of the drawing. The trailer hitch may, of course, be welded to the vehicle frame if a permanent mount is desired. As shown in FIG. 1, arm 8 is retracted into frame interior 40 of frame 2 by the action of elbow hinge 9 and arm pivot pin 25, and is securely held in place by spring loaded arm lock pin 26. Arm lock pin 26 is preferably positioned essentially in line with ball 21 in order to provide maximum tow strength, and the pin also serves to minimize movement of arm 8 inside frame interior 40 during the towing operation. As an optional added safety precaution, arm safety pin 29 may be used to positively lock arm 8 into position in frame 2. When so retracted, adjustable trailer hitch 1 positions ball 21, bolted onto ball support 20 by means of ball nut 32 (illustrated in FIG. 3), into conventional configuration with respect to a towed trailer. Safety chain apertures 22, located in ball support 20, may be provided as on conventional hitches, although the safety chain may be alternatively affixed to the vehicle frame if desired. It will be appreciated that pull rings 23, in cooperation with arm lock pin 26 and arm safety pin 29, are preferred in order to facilitate ready manipulation and removal and insertion of these pins in frame 2. Ball support 20 is typically welded to frame 2 and is strengthened by one or more ball support webbs, 34.

Referring now to FIGS. 2 and 3 of the drawing, it will be appreciated that elbow hinge 9 is designed to facilitate ready closure or retraction of arm 8 into frame interior 40 of frame 2. Arm lock pin 26 is designed to register with frame slot 7 when arm 8 is in retracted position, and spring 27 serves to bias arm lock pin 26 in place in an aperture in the bottom of frame 2 (not illustrated). Arm lock pin 26 is also fitted with spring retaining pin 38, mounted in the interior of arm 8 to enable arm lock pin 26 to be lifted against the bias of spring 27 and permit arm 8 to be pulled into extended configuration. Accordingly, when arm 8 is in retracted position as illustrated in FIGS. 2 and 3, a trailer may be coupled to ball 21 and towed with full assurance that arm 8 cannot inadvertently extend. In order to further positively secure arm 8 in retracted position with respect to frame 2, arm safety pin 29 may be inserted in frame safety pin aperture 24 in frame 2, and registering arm safety pin aperture 36 in arm 8 (illustrated in FIG. 4).

Referring now to FIG. 4 of the drawing, adjustable trailer hitch 1 is illustrated in extended position with arm lock pin 26 released from cooperation with frame 2, and arm 8 extended toward ball receptacle 37 of a conventional trailer. From a consideration of the position of extended arm 8 in FIG. 4, and referring again to FIG. 2 of the drawing, it will be appreciated that ball 21 can be positioned substantially anywhere within the radius of a circle having as its center point arm pivot pin 25 as illustrated by the arrow. This adjustment potential is effected by the combined function of elbow hinge 9 and arm pivot pin 25. For example, if ball receptacle 37 is positioned relatively close to adjustable trailer hitch 1, as illustrated in FIG. 4 of the drawing, arm 8 can be retracted and ball 21 positioned in cooperation with ball receptacle 37 and securely locked in place. Accordingly, by virtue of the pivot point at arm pivot pin 25 and elbow hinge 9, ball 21 can be maneuvered into cooperation with any ball receptacle by means of the cooperating pivot movement provided by arm pivot pin 25 and the extension and retraction function permitted by elbow hinge 9. As shown in FIG. 3, arm pivot pin bushing 42 is positioned in the interior of arm 8 and is designed to receive arm pivot pin 25 in registering relationship to prevent the pin from wallowing in arm 8 and frame 2.

Referring now to FIGS. 2, 5 and 6 of the drawing, as heretofore noted, the unique extension and retraction maneuverability of adjustable trailer hitch 1 is permitted by means of the combined hinge function of elbow hinge 9 in cooperation with the pivoting function of arm 8 on arm pivot pin 25. Elbow hinge 9 is made functional by arm recess 11 notched into arm 8, and arm projections 12, in cooperation with arm recess 11, which projections in turn cooperate with arm hinge plate 13, fitted within arm 8. Hinge plate aperture 14, in hinge plate 13, is adapted to register with arm projection apertures 19, in arm projections 12, to permit elbow hinge pin 10 to be placed into position in registration with arm projection apertures 19 and hinge plate aperture 14. Thus, arm projections 12, in cooperation with elbow hinge pin 10 and hinge plate 13, permits arm 8 to extend from frame 2 and describe an acute angle upon full extension of arm 8, as particularly illustrated in FIGS. 2 and 4. Spring access aperture 44, illustrated in FIG. 5, is provided in arm 8 adjacent arm lock pin 26 to permit insertion and replacement of spring 27 and spring retaining pin 38. Arm 8 is designed and adapted to extend to a point where the arm describes an acute angle, since further extension would inhibit proper retraction of the hitch, as hereinafter described. Washers 30 are preferably used to effect friction-free movement of the inside surfaces of arm projections 12 and the outside surfaces of hinge plate 13. Washers 30 may be formed of such materials as brass, nylon and teflon, and of these materials, teflon is preferred.

Referring again to FIGS. 2 and 4 of the drawing, it will be appreciated that the pivoted end of arm 8 is designed to contact rear plate 35 of frame 2 at full extension of arm 8. The pivoted end of arm 8 is preferably bevelled in order to provide a positive contact with rear plate 35 when the arm is extended, as illustrated. Furthermore, the opposite ends of arm 8, both at elbow hinge 9 and at the extreme extended end of arm 8 are also bevelled, both to provide the appropriate angle of extension at elbow hinge 9 and to allow arm 8 to coincide with frame 2 when retracted. Accordingly, the bevelled ends of arm 8 and the sides of the arms essentially form two parallelograms joined by elbow hinge 9. Accordingly, rear plate 35, in cooperation with elbow hinge 9, operates to prevent ball 21 from traversing a predetermined point when arm 8 is fully extended and pivoted. This predetermined point is represented by line 39 in FIG. 2, extending through ball 21 perpendicular to the longitudinal axis of frame 2. If ball 21 were allowed to extend substantially to the right of line 39, arm 8 and ball 21 could fold to the right of, and away from frame 2, and would accordingly fail to lock into frame 2. From a consideration of the location of line 39 at full extension of arm 8, it will be apparent that subsequently backing the vehicle carrying the hitch will effect locking of arm 8 inside frame 2. However, it is significant that arm 8 must be fully extended prior to the backing operation to insure that positive locking occurs.

After ball 21 has been locked into ball receptacle 37, the vehicle carrying adjustable trailer hitch 1 is initially pulled forward to extend arm 8 as shown in FIG. 4, and subsequently backed up until arm lock pin 26 engages frame lip 3, and locks into position, as illustrated in FIGS. 1 and 2 of the drawing. Arm safety pin 29 can then be placed in frame safety pin aperture 24, if desired, as an added precaution during towing. Frame lip 3 also serves to guide arm 8 into position inside frame interior 40 as the trailer hitch is retracted.

As heretofore noted, it will be appreciated that frame 2 of adjustable trailer hitch 1 can be bolted or welded to the vehicle frame, as desired. If bolted, the hitch is preferably affixed to a vehicle frame or bumper by means of mounting bolts 4 and nuts 5, as illustrated in FIG. 7 of the drawing. Bolts 4 are preferably countersunk in frame 2 as illustrated, to allow ample room within frame 2 for retraction of arms 8.

Referring again to FIGS. 1 and 2 of the drawing, it will be appreciated that while ball 21, mounted on ball support 20 and carried by arm 8, is a preferred means for securing the hitch to a trailer, alternative coupling devices may be used without departing from the spirit and scope of this invention. For example, ball 21 may be unbolted and removed from ball support 20, or a second hole provided in ball support 20 beside ball 21 to receive a pin from a clevis coupling mounted on a trailer tongue in lieu of the conventional ball coupling mechanism. Arm 8 can be extended and precisely positioned at the point where the hole in ball support 20 registers with the clevis mounted on the trailer tongue, a clevis pin fitted into the registering holes, and the vehicle subsequently pulled forward and then backed to effect automatic retraction of arm 8 into frame 2 for towing, as heretofore described. In the alternative, arm 8 can be removed, the clevis hitch matched with frame safety pin aperture 24 and arm safety pin 29 inserted to couple the clevis hitch to frame 2.

It will be further appreciated that the free end and pinned ends of arm 8 are preferably bevelled at an angle of about 40°. The free end is bevelled to permit fitting of the bevelled end with the contour of frame 2, and the pinned end of arm 8 is likewise bevelled to achieve maximum arm strength when arm 8 is fully extended, since the bevel is adjacent rear plate 15 as illustrated in FIG. 4. This latter bevel also serves to prevent ball 21 from extending past line 39 to prevent a non positive lock, as shown in FIG. 2 of the drawing. Arm 8 is also bevelled at hinge 9 in order to effect an acute angle formed by arm 8 when fully extended, to in turn effect positive locking of arm 8 inside frame 2 when the hitch is retracted.

While the trailer hitch of this invention is characterized by extensive arm retraction and extension capability to enable multiple positioning of the hitch ball, as heretofore discussed, the arm may be securely pinned in the frame for security by means of arm lock pin 26 and arm safety pin 29. Furthermore, referring again to FIG. 3 of the drawing, frame 2 serves as a vertical support for arm 8 in retracted towing configuration, since arm 8 fits snugly inside frame interior 40 with very little tolerance. The configuration of frame interior 40 is maintained in close tolerance with arm 8 by the rigidity of frame 2, which is strengthened by webs 34, designed to brace frame 2. Accordingly, ball 21 and arm 8 are allowed very little vertical movement and essentially no horizontal freedom while in the towing configuration.

While the adjustable trailer hitch of this invention is designed to be retracted prior to towing a trailer after the latter is locked onto the hitch, the hitch design is such that towing may be achieved while the hitch is in extended configuration. Thus, under circumstances where the trailer to be moved is located in an inaccessible spot, the hitch-carrying vehicle can be backed as closely as possible, the hitch arm extended and coupled to the trailer, and the trailer towed out of the confined area with the hitch still in extended configuration. After the trailer is moved to the point where the vehicle may again be initially pulled forward to fully extend the hitch and then backed up, this maneuver is accomplished, the hitch is automatically retracted, and normal towing configuration is achieved.

The strength of the arm and frame while in extended configuration is also important as a safety feature in the highly unlikely event of inadvertent extension of the hitch during the towing operation. Again referring to FIGS. 2 and 4 of the drawing, if such extension should occur due to failure of arm lock pin 26 and arm safety pin 29, elbow hinge 9 and arm pivot pin 25 are designed to independently bear the towing load, and the trailer would still be secure.

It will be appreciated that adjustable trailer hitch 1 is capable of being disassembled by merely removing key pins. Thus, referring to FIG. 6 of the drawing, arm 8 can be disassembled at elbow hinge 9 by removing cotter pin 18 from elbow hinge pin aperture 17, and subsequently removing elbow hinge pin 10. In like manner, arm 8 can be removed from frame 2 by repeating the cotter pin removal procedure and pulling arm pivot pin 25 out of registering apertures in arm 8 and frame 2. Furthermore, as heretofore discussed, the entire hitch can be removed from the carrying vehicle by removal of mounting nuts 5 from mounting bolts 4 attached to frame 2. Accordingly, if arm 8, ball support 20, or frame 2 is damaged, the appropriate pins can be removed and new parts inserted, as desired, without the necessity of replacing the entire hitch.

Having described my invention with the particularity set forth above, what is claimed is:

1. An adjustable trailer hitch comprising:
  a. a frame capable of being mounted on a vehicle;
  b. an arm pivoted to said frame at one end thereof and having an elbow hinge intermediate the ends thereof dividing said arm into a pair of pivotal arm members movable about said elbow hinge and bevelled to permit a predetermined degree of extension of said pivotal arm members with respect to each other about said elbow hinge, said arm also having a bevel at the pivoted end thereof, said bevel contacting said frame when said arm is fully extended to a preselected degree with respect to said frame, said pivotal arm members being foldable about said elbow hinge into parallel abutting relation when said arm is pivoted into a fully retracted position with respect to said frame; and
  c. means carried by the free end of said arm for releasably locking to a trailer to permit towing of said trailer by said vehicle.

2. The trailer hitch of claim 1 further including mounting apertures in said frame whereby said frame can be bolted onto said vehicle.

3. The trailer hitch of claim 1 wherein the pivoted end of said arm is releasably and pivotably secured to said frame by a removable pin.

4. The trailer hitch of claim 1 wherein said means carried by the free end of said arm is a ball.

5. The trailer hitch of claim 1 wherein:
  a. said frame is bolted onto said vehicle;
  b. said pivoted end of said arm is releasably and pivotably secured to said frame by a removable pin; and
  c. said means carried by the free end of said arm is a ball.

6. an adjustable trailer hitch comprising:
  a. a hollow frame mounted on a vehicle and capable of receiving a hinged arm folded in the interior thereof;
  b. an arm pivoted in the interior of said frame at open end thereof and having an elbow hinge intermediate the ends thereof dividing said arm into pair of pivotal arm members movable about said elbow hinge and bevelled to permit a predetermined degree of extension of said pivotal arm members with respect to each other about said elbow hinge, said arm also having a bevel at the pivoted end thereof to contact said frame at a predetermined degree of extension when said arm is fully extended from said frame to permit extension of said arm to predetermined degree, said pivotal arm members being foldable about said elbow hinge into parallel abutting relationship when said arm is pivoted into fully retracted position inside said frame; and
  c. lock means carried by said free end of said arm for removably cooperating with a mating receptacle on a trailer to permit towing of said trailer by said vehicle.

7. The adjustable trailer hitch of claim 6 wherein said lock means is a ball, and retraction of said hitch is achieved by initially pulling said vehicle forward and subsequently backing said vehicle after effecting removable cooperation between said lock means and said receptacle.

8. The adjustable trailer hitch of claim 7 further comprising an arm lock pin carried by said arm to lock said arm into retracted position in said frame.

9. The adjustable trailer hitch of claim 8 further comprising a removable pin in said hinged elbow cooperating with said pivoted end and said free end of said arm to permit said arm to be disassembled.

* * * * *